UNITED STATES PATENT OFFICE.

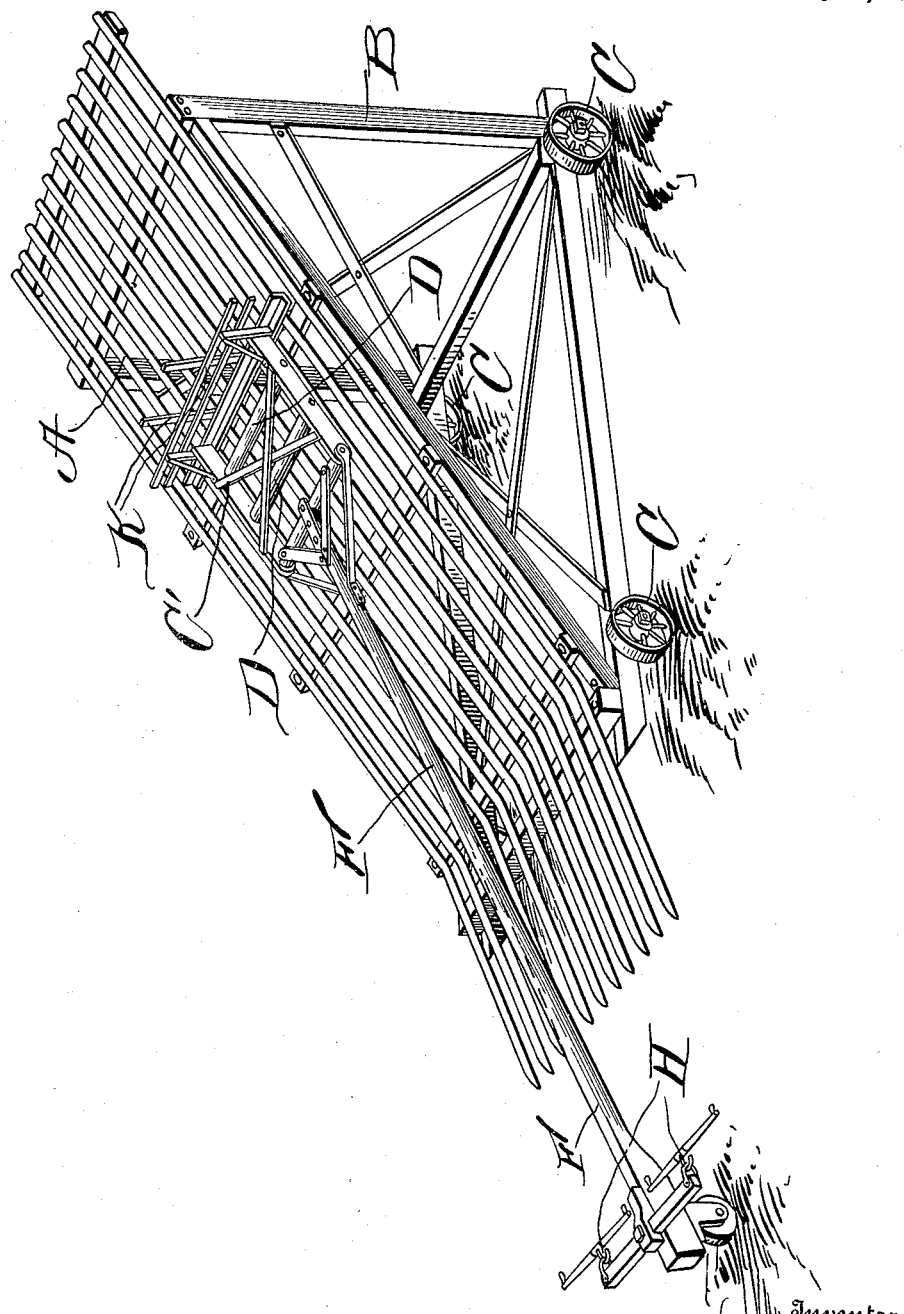

JOHN E. BLANSETT, OF TETON, IDAHO, ASSIGNOR OF ONE-THIRD TO ALBERT T. KNAUSS, OF TETON, IDAHO.

HAY-STACKER.

1,139,157.

Specification of Letters Patent. Patented May 11, 1915.

Application filed September 1, 1914. Serial No. 859,645.

*To all whom it may concern:*

Be it known that I, JOHN E. BLANSETT, a citizen of the United States, residing at Teton, in the county of Fremont and State of Idaho, have invented certain new and useful Improvements in Hay-Stackers; and I do hereby declare the following to be a full, clear, and exact description of the invention, such as will enable others, skilled in the art to which it appertains to make and use the same, reference being had to the accompanying drawings, and to the letters and figures of reference marked thereon, which form a part of this specification.

This invention relates to new and useful improvements in apparatus for stacking hay and consists of a simple and efficient apparatus of this nature having various details of construction, combinations and arrangements of parts which will be hereinafter fully described, shown in the accompanying drawings and then specifically defined in the appended claim.

My invention is illustrated in the accompanying drawings, in which I have shown a perspective view of my invention.

Reference now being had to the details of the drawings by letter, A designates an inclined rack, made up of bars which are spaced apart, and which are supported upon a suitable frame B, having wheels C for convenience in moving the rack from one place to another. The stacker member consists of a frame C′ having rollers D intermediate the same, adapted to travel upon said rack, and a beam F is fastened to said frame and to the lower end of which a whiffletree H is adapted to be fastened to which the horses are attached. At one end of the frame is a hay holding rack K, comprising bars which are spaced apart and held securely by braces upon said frame. In operation, the hay is deposited at the foot of the inclined rack and in advance of the stacker member, after which the team which is attached to the beam is driven forward, causing the rollers upon the frame to move up the inclined rack, pushing the hay in advance until it drops off over the upper ends of the inclined bars of the rack upon the stack. After the hay has been dumped, the team is reversed and the pushing frame is drawn down the incline to receive a second load.

What I claim to be new is:

A hay stacking apparatus comprising an inclined rack made up of a frame having slats which are bent at angles near the lower end of the frame, a stacker member located on said rack comprising a frame with rollers therein and a flange at its forward end and a rack projecting above the flange, a beam having pivotal connection with the frame carrying said roller and adapted to move the stacker member over the inclined rack.

In testimony whereof I hereunto affix my signature in presence of two witnesses.

JOHN E. BLANSETT.

Witnesses:
C. W. POOLE,
J. C. DUFFIN.

Copies of this patent may be obtained for five cents each, by addressing the "Commissioner of Patents, Washington, D. C."